US009364986B1

(12) United States Patent
Patterson

(10) Patent No.: US 9,364,986 B1
(45) Date of Patent: Jun. 14, 2016

(54) METHOD FOR THREE-DIMENSIONAL MANUFACTURING AND HIGH DENSITY ARTICLES PRODUCED THEREBY

(75) Inventor: Clark Patterson, Akron, OH (US)

(73) Assignee: Rapid Prototype and Manufacturing LLC, Avon Lake, OH (US)

( * ) Notice: Subject to any disclaimer, the term of this patent is extended or adjusted under 35 U.S.C. 154(b) by 832 days.

(21) Appl. No.: 13/477,468

(22) Filed: May 22, 2012

(51) Int. Cl.
*B29C 47/14* (2006.01)
*B29C 47/00* (2006.01)
*B29C 67/00* (2006.01)

(52) U.S. Cl.
CPC ......... *B29C 47/0014* (2013.01); *B29C 67/0051* (2013.01)

(58) Field of Classification Search
CPC .................................................. B29C 67/0051
USPC ....................................................... 252/515
See application file for complete search history.

(56) References Cited

U.S. PATENT DOCUMENTS

| | | |
|---|---|---|
| 5,121,329 A | 6/1992 | Crump |
| 5,340,433 A | 8/1994 | Crump |
| 5,426,722 A | 6/1995 | Batchelder |
| 5,491,643 A | 2/1996 | Batchelder |
| 5,503,785 A | 4/1996 | Crump et al. |
| 5,587,913 A | 12/1996 | Abrams et al. |
| 5,653,925 A | 8/1997 | Batchelder |
| 5,764,521 A | 6/1998 | Batchelder et al. |
| 5,866,058 A | 2/1999 | Batchelder et al. |
| 5,900,207 A | 5/1999 | Danforth et al. |
| 5,939,008 A | 8/1999 | Comb et al. |
| 5,968,561 A | 10/1999 | Batchelder et al. |
| 6,004,124 A | 12/1999 | Swanson et al. |
| 6,022,207 A | 2/2000 | Dahlin et al. |
| 6,028,410 A | 2/2000 | Leavitt et al. |
| 6,054,077 A | 4/2000 | Comb et al. |
| 6,067,480 A | 5/2000 | Stuffle et al. |
| 6,070,107 A | 5/2000 | Lombardi et al. |
| 6,085,957 A | 7/2000 | Zinniel et al. |
| D436,111 S | 1/2001 | Hahn et al. |
| 6,228,923 B1 | 5/2001 | Lombardi et al. |
| 6,238,613 B1 | 5/2001 | Batchelder et al. |
| 6,367,791 B1 | 4/2002 | Calderon et al. |
| 6,437,034 B2 | 8/2002 | Lombardi et al. |
| 6,547,995 B1 | 4/2003 | Comb |
| 6,578,596 B1 | 6/2003 | Batchelder et al. |
| 6,629,011 B1 | 9/2003 | Calderon et al. |
| 6,645,412 B2 | 11/2003 | Priedman, Jr. |
| 6,685,866 B2 | 2/2004 | Swanson et al. |
| 6,722,872 B1 | 4/2004 | Swanson et al. |
| 6,749,414 B1 | 6/2004 | Hanson et al. |
| 6,776,602 B2 | 8/2004 | Swanson et al. |
| 6,790,403 B1 | 9/2004 | Priedman, Jr. et al. |
| 6,814,907 B1 | 11/2004 | Comb |
| 6,866,807 B2 | 3/2005 | Comb et al. |
| 6,869,559 B2 | 3/2005 | Hopkins |
| 6,923,634 B2 | 8/2005 | Swanson et al. |
| D514,913 S | 2/2006 | Dunn et al. |
| 6,998,087 B1 | 2/2006 | Hanson et al. |
| 7,063,285 B1 | 6/2006 | Turley et al. |
| 7,122,246 B2 | 10/2006 | Comb et al. |
| 7,125,512 B2 | 10/2006 | Crump et al. |
| 7,127,309 B2 | 10/2006 | Dunn et al. |
| 7,169,337 B2 | 1/2007 | Swanson et al. |
| 7,172,715 B2 | 2/2007 | Swanson et al. |
| 7,236,166 B2 | 6/2007 | Zinniel et al. |
| 7,255,821 B2 | 8/2007 | Priedman, Jr. et al. |
| 7,297,304 B2 | 11/2007 | Swanson et al. |
| 7,314,591 B2 | 1/2008 | Priedman, Jr. |
| 7,341,214 B2 | 3/2008 | Taatjes et al. |
| 7,374,712 B2 | 5/2008 | Swanson et al. |
| 7,384,255 B2 | 6/2008 | LaBossiere et al. |
| 7,403,833 B2 | 7/2008 | Heide et al. |
| 7,502,023 B2 | 3/2009 | Zinniel et al. |
| 7,534,386 B2 | 5/2009 | Priedman, Jr. |
| 7,555,357 B2 | 6/2009 | Holzwarth |
| D598,733 S | 8/2009 | Taatjes et al. |
| D598,922 S | 8/2009 | Taatjes et al. |
| 7,604,470 B2 | 10/2009 | LaBossiere et al. |
| D606,845 S | 12/2009 | Taatjes et al. |
| D606,998 S | 12/2009 | Taatjes et al. |
| 7,625,200 B2 | 12/2009 | Leavitt |
| 7,680,555 B2 | 3/2010 | Dunn et al. |
| D618,086 S | 6/2010 | Taatjes et al. |
| 7,744,364 B2 | 6/2010 | Turley et al. |
| 7,754,807 B2 | 7/2010 | Priedman, Jr. et al. |
| D628,466 S | 12/2010 | Taatjes et al. |
| 7,891,964 B2 | 2/2011 | Skubic et al. |
| D633,916 S | 3/2011 | Taatjes et al. |
| 7,896,209 B2 | 3/2011 | Batchelder et al. |
| 7,897,074 B2 | 3/2011 | Batchelder et al. |
| 7,899,569 B2 | 3/2011 | Holzwarth |
| 7,910,041 B1 | 3/2011 | Priedman, Jr. |
| 7,917,243 B2 | 3/2011 | Kozlak et al. |
| 7,938,351 B2 | 5/2011 | Taatjes et al. |
| 7,938,356 B2 | 5/2011 | Taatjes et al. |
| 7,942,987 B2 | 5/2011 | Crump et al. |
| 8,014,889 B2 | 9/2011 | Zinniel et al. |
| 8,033,811 B2 | 10/2011 | Swanson et al. |
| 8,050,786 B2 | 11/2011 | Holzwarth |
| D650,787 S | 12/2011 | Taatjes et al. |
| 8,070,473 B2 | 12/2011 | Kozlak |
| 8,075,300 B2 | 12/2011 | Zinniel |
| 8,123,999 B2 | 2/2012 | Priedman, Jr. et al. |
| 8,132,753 B2 | 3/2012 | Taatjes et al. |
| 8,153,182 B2 | 4/2012 | Comb et al. |

(Continued)

*Primary Examiner* — Ian Rummel
(74) *Attorney, Agent, or Firm* — Tarolli, Sundheim, Covell & Tummino LLP

(57) ABSTRACT

The present invention includes methods of three-dimensional printing as well as the high density and/or radiopaque three-dimensional articles produced thereby. Articles prepared in accordance with the method of the present invention may be used as production articles or as prototypes to be able to demonstrate the shielding characteristics of shaped articles in instances where production articles may later be produced by injection molding. The method of the present invention may be carried out using fused deposition modeling or selective laser sintering methods known and used in the art.

3 Claims, No Drawings

(56) References Cited

U.S. PATENT DOCUMENTS

| | | |
|---|---|---|
| 8,153,183 B2 | 4/2012 | Skubic et al. |
| 8,155,775 B2 | 4/2012 | Batchelder |
| 8,157,202 B2 | 4/2012 | Taatjes et al. |
| 2002/0017743 A1* | 2/2002 | Priedeman, Jr. ............... 264/464 |
| 2003/0069344 A1* | 4/2003 | Nishikawa et al. ........... 524/439 |
| 2009/0099600 A1* | 4/2009 | Moore et al. .................. 606/246 |
| 2010/0160547 A1* | 6/2010 | Martinoni ...................... 524/599 |

* cited by examiner

METHOD FOR THREE-DIMENSIONAL MANUFACTURING AND HIGH DENSITY ARTICLES PRODUCED THEREBY

RELATED APPLICATION DATA

None.

STATEMENT OF GOVERNMENT INTEREST

None.

TECHNICAL FIELD OF THE INVENTION

The present invention is in the field of three-dimensional printing of polymeric objects, and related processing methods.

BACKGROUND

The field of rapid prototyping involves the production of prototype polymeric articles and small quantities of functional polymeric parts, directly from computer-generated design data.

Two well-known methods for rapid prototyping include a selective laser sintering process and a liquid binder three dimensional printing process. These techniques are similar, to the extent that they both use layering techniques to build three-dimensional articles. Both methods form successive thin cross-sections of the desired article. The individual cross-sections are formed by bonding together adjacent grains of a granular, (i.e., particulate) material on a generally planar surface of a bed of the granular material. Each layer is bonded to a previously formed layer at the same time as the grains of each layer are bonded together to form the desired three-dimensional article. The laser-sintering and liquid binder techniques are advantageous because they create parts directly from computer-generated design data and can produce parts having complex geometries. Moreover, three dimensional printing may be quicker and less expensive than machining of prototype parts or production of cast or molded parts by conventional "hard" or "soft" tooling techniques that can take from a few weeks to several months, depending on the complexity of the item. By contrast, the three dimensional printing process allows one to produce a demonstration prototype or in some instances, a usable part, within hours or days.

An extrusion-based layered deposition system (e.g., fused deposition modeling systems developed by Stratasys, Inc., Eden Prairie, Minn.) is typically used to build a 3D object from a CAD model in a layer-by-layer fashion by extruding a flowable build material, such as a thermoplastic material. The build material is extruded through a nozzle carried by an extrusion head, and is deposited as a sequence of roads on a base in an x-y plane. The extruded build material fuses to previously-deposited build material, and solidifies upon a drop in temperature. The position of the extrusion head relative to the base is then incremented along a z-axis (perpendicular to the x-y plane), and the process is then repeated to form a 3D object resembling the CAD model.

In many instances, it is desirable to be able to construct three-dimensional objects that are of high density or that offer sufficiently high radio-opacity to be able to provide application-satisfactory radioactive or electromagnetic radiation shielding.

It is likewise desirable in other applications to be able to produce articles or prototypes of relatively high density to be able to take advantage of higher density in applications where three dimensional printing is advantageous, scuh as for the production of prototypes or operative articles, particularly where dimensional stability, strength, reliability and manufacturing consistency are beneficial.

SUMMARY OF THE INVENTION

The present invention includes methods of three-dimensional printing as well as the high density and/or radiopaque three-dimensional articles produced thereby.

Articles prepared in accordance with the method of the present invention may be used as production articles or as prototypes to be able to demonstrate the shielding characteristics of shaped articles in instances where production articles may later be produced by injection molding.

The method of the present invention may be carried out using FDM or SLS methods known and used in the art.

The fill-in material or materials that may be used in accordance with the present invention may be any filler material of sufficient density and/or radio-opacity for the intended purpose of the rendered part or component from the three dimensional manufacturing process. Such filler materials include those selected from the group consisting of ferrous alloys (preferably stainless steel ferrous alloys), copper, bismuth compounds (e.g., oxides, subcarbonates, and oxychlorides), barium compounds (e.g., sulfates and titanates), tungsten and tungsten alloys, and boron compounds (e.g., those especially useful in neutron shielding); and any mixtures of the foregoing.

The polymers or polymer blends that may be used in the method of the present invention may include any such materials that are amendable for use in three dimensional printing, such as thermoset polymers, thermoplastic polymers and elastomeric polymers, as well as blends of such materials.

The processes through which the three dimensional printing method of the present invention may be carried out may include selective laser sintering (SLS) and fused deposition modeling (FDM) processes.

The uses and applications to which parts and articles of the present invention may be employed may include radiation shielding, such as the shielding of x-rays, gamma rays, neutrons and EMI/RFI shielding.

Method with Polymer Composition Mixture Having a Particulate Phase and Based Upon Radio-Opacity of the Product In general terms, the method of the present invention includes a method of additive manufacturing a three-dimensional object comprising sequentially depositing layers of a thermoplastic polymer composition mixture comprising a polymer phase and a particulate phase, the polymer phase comprising at least one thermoplastic polymer and the particulate phase comprising a radio-opaque material in sufficient quantity, such that the three-dimensional object rendered by the sequential deposition has a radio-opacity sufficient for the desired application which may be determined in advance of manufacture. This may be expressed in terms of radio-opacity or other shielding parameters, such as Hounsfield units.

The thermoplastic polymer(s) may comprise one or more semi-crystalline polymer(s) or one or more amorphous polymer(s).

The radio-opaque or shielding characteristic imparting material may be any material adapted to impart the desired radio-opacity or shielding characteristic and may be from the group consisting of tungsten, barium sulfate, ferrous alloys (preferably stainless steel alloys), copper, bismuth oxides, bismuth subcarbonates, bismuth oxychlorides, barium sulfates, barium titanates, and boron compounds.

Preferably, the radio-opaque or shielding material comprises tungsten in an amount in the range of from about 80 percent to about 97 percent by weight.

The present invention also includes a three-dimensional object manufactured in accordance with this method, or otherwise having the characteristics of an object so produced.

Method with Polymer Composition Mixture Having Metallic Particulate and Based Upon Specific Gravity of the Product The method of the present invention also includes a method of additive manufacturing a three-dimensional object comprising sequentially depositing layers of a thermoplastic polymer composition mixture comprising a polymer phase and a particulate filler phase, the polymer phase comprising at least one thermoplastic polymer and the particulate filler phase being in sufficient quantity so as to render the three-dimensional object so formed to a specific gravity above 2.5, preferably having a specific gravity above 5.0, and most preferably having a specific gravity above 8.0.

The density-imparting filler material may be any density-imparting material, such as metallic or metalloid materials, and those materials selected from the group consisting of tungsten, barium sulfate, stainless steel alloys, copper, bismuth oxides, bismuth subcarbonates, bismuth oxychlorides, barium sulfates, barium titanates, and boron compounds, or mixtures thereof.

Most preferably, the density-imparting filler material comprises tungsten in an amount sufficient to attain a specific gravity above 2.5.

The present invention also includes a three-dimensional object manufactured in accordance with this method, or otherwise having the characteristics of an object so produced.

Method with Polymer Composition Mixture Having Particulate Filler Particulate and Based Upon Percent by Volume of the Particulate Filler Phase The present invention also includes a method generally described as a method of additive manufacturing a three-dimensional object comprising sequentially depositing layers of a thermoplastic polymer composition mixture comprising a polymer phase and a particulate filler phase, the particulate filler phase comprising a material selected from the group consisting of tungsten, barium sulfate, stainless steel alloys, copper, bismuth oxides, bismuth subcarbonates, bismuth oxychlorides, barium sulfates, barium titanates, and boron compounds, or mixtures thereof, and the polymer phase comprising at least one thermoplastic polymer, with and the particulate filler phase being present in the range of above about 20 percent by volume.

It is preferred that such a particulate filler phase is present in the range of from about 20 to about 55 percent by volume, and preferably in the range of from about 35 to about 55 percent by volume.

Most preferably, the particulate filler phase comprises tungsten present in the range of above about 35 percent by volume.

The present invention also includes a three-dimensional object manufactured in accordance with this method, or otherwise having the characteristics of an object so produced.

The present invention further includes a method generally described as a method of additive manufacturing a three-dimensional object comprising sequentially depositing layers of a thermoplastic polymer composition mixture comprising a polymer phase and a particulate filler phase, the polymer phase comprising at least one thermoplastic polymer and the particulate filler phase being present in the range of above about 35 percent by volume for fillers other than those referenced above.

The present invention also includes a three-dimensional object manufactured in accordance with this method, or otherwise having the characteristics of an object so produced.

Method with Polymer Composition Mixture Having Particulate Filler Particulate and Based Upon Percent by Weight of the Particulate Filler Phase Also part of the present invention is a method of additive manufacturing a three-dimensional object comprising sequentially depositing layers of a thermoplastic polymer composition mixture comprising a polymer phase and a particulate filler phase, the polymer phase comprising at least one thermoplastic polymer and the particulate filler phase being present in the range of above about 80 percent by weight, most preferably above 90 percent by weight.

The desired density may vary with the use to which the object will be put.

The particulate filler phase may comprise a material selected from the group consisting of tungsten, barium sulfate, stainless steel alloys, copper, bismuth oxides, bismuth subcarbonates, bismuth oxychlorides, barium sulfates, barium titanates, and boron compounds, and mixtures thereof.

It is most preferred that the particulate filler phase comprises tungsten present in the range of from about 80 percent to about 97 percent by weight.

The present invention also includes a three-dimensional object manufactured in accordance with this method, or otherwise having the characteristics of an object so produced.

DETAILED DESCRIPTION OF THE PREFERRED EMBODIMENTS OF THE INVENTION

In accordance with the foregoing summary, the following presents a detailed description of the preferred embodiments of the present invention which are presently considered to be the best mode thereof.

Examples

The method of the present invention was carried out using a number of different polymeric filament blends as shown in Tables 1 through 4 below.

TABLE 1

|  | DENSITY | % BY VOLUME |  | % BY WEIGHT |
|---|---|---|---|---|
| tungsen | 19.25 | 21.0% | 4.0425 | 81.0% |
| PC | 1.2 | 79% | 0.948 | 19.0% |
|  |  |  | SG = 4.9905 |  |

TABLE 2

|  | DENSITY | % BY VOLUME |  | % BY WEIGHT |
|---|---|---|---|---|
| tungsen | 19.25 | 54.5% | 10.49125 | 95.1% |
| PC | 1.2 | 46% | 0.546 | 4.9% |
|  |  |  | SG = 11.03725 |  |

TABLE 3 next FDM material

| | DENSITY | % BY VOLUME | | % BY WEIGHT |
|---|---|---|---|---|
| tungsen | 19.25 | 35.0% | 6737.5 | 89.6% |
| PC | 1.2 | 65% | 0.78 | 10.4% |
| | | | SG = 7.5175 | |

TABLE 4

FDM may shield like inj. mold SG-11

| | DENSITY | % BY VOLUME | | % BY WEIGHT |
|---|---|---|---|---|
| tungsen | 19.25 | 31.5% | 606375 | 88.10% |
| PC | 1.2 | 69% | 0.822 | 11.9% |
| | | | SG = 6.88575 | |

PC stands for polycarbonate
SG stands for specific gravity

The polymeric filaments may be provided to any FDM three dimensional printing system such as those commercially available from Stratasys, Inc. of Eden Prairie, Minn.

The results of the method of the present invention demonstrate that articles of relatively high density and specific gravity can be produced using the filament lens of the present invention in an FDM manufacturing system.

The foregoing results demonstrate that articles having specific gravity value of at least about five and up to at least eleven can be achieved using the method and materials of the present invention, and that these articles can be produced with consistent dimensions.

In addition, articles in accordance with the present invention, and those rendered in accordance with the method of the present invention exhibit dimensional stability and sufficient ruggedness to be able to be used either as a prototype article or part or, in some instances, as a production article or part.

Such articles may be beneficially applied in applications that require radioactive and electromagnetic radiation shielding as well as other applications requiring relatively high density materials.

The invention may be embodied in other specific forms without departing from the spirit or essential characteristics thereof. The foregoing embodiments are therefore to be considered in all respects illustrative rather than limiting on the invention described herein. The scope of the invention is thus indicated by the appended claims rather than by the foregoing description, and all changes that come within the meaning and range of equivalency of the claims are intended to be embraced therein.

The following references are hereby incorporated herein by reference:

1 U.S. Pat. No. 8,157,202 Filament container and methods of use thereof
2 U.S. Pat. No. 8,155,775 Support structure packaging
3 U.S. Pat. No. 8,153,183 Adjustable platform assembly for digital manufacturing system
4 U.S. Pat. No. 8,153,182 Adjustable head mount for digital manufacturing system
5 U.S. Pat. No. 8,132,753 Filament spool and filament spool container, and methods of use thereof
6 U.S. Pat. No. 8,123,999 Smoothing method for layered deposition modeling
7 D650,787 Filament spool container
8 U.S. Pat. No. 8,075,300 Vapor smoothing surface finishing system
9 U.S. Pat. No. 8,070,473 System for building three-dimensional objects containing embedded inserts, and method of use thereof
10 U.S. Pat. No. 8,050,786 Method for building three-dimensional objects with thin wall regions
11 U.S. Pat. No. 8,033,811 Pantograph assembly for digital manufacturing system
12 U.S. Pat. No. 8,014,889 Transactional method for building three-dimensional objects
13 U.S. Pat. No. 7,942,987 System and method for building three-dimensional objects with metal-based alloys
14 U.S. Pat. No. 7,938,356 Filament spool
15 U.S. Pat. No. 7,938,351 Filament guide mechanism for filament spool container
16 U.S. Pat. No. 7,917,243 Method for building three-dimensional objects containing embedded inserts
17 U.S. Pat. No. 7,910,041 Build materials containing nanofibers for use with extrusion-based layered depositions systems
18 D633,916 Filament spool container
19 U.S. Pat. No. 7,899,569 Method for building three-dimensional objects with extrusion-based layered deposition systems
20 U.S. Pat. No. 7,897,074 Liquefier assembly for use in extrusion-based digital manufacturing systems
21 U.S. Pat. No. 7,896,209 Filament drive mechanism for use in extrusion-based digital manufacturing systems
22 U.S. Pat. No. 7,891,964 Viscosity pump for extrusion-based deposition systems
23 D628,466 Filament spool
24 U.S. Pat. No. 7,754,807 Soluble material and process for three-dimensional modeling
25 U.S. Pat. No. 7,744,364 Extrusion tip cleaning assembly
26 D618,086 Filament spool
27 U.S. Pat. No. 7,680,555 Auto tip calibration in an extrusion apparatus
28 D606,998 Filament spool container
29 D606,845 Filament spool
30 U.S. Pat. No. 7,625,200 Extrusion head for use in extrusion-based layered deposition modeling
31 U.S. Pat. No. 7,604,470 Single-motor extrusion head having multiple extrusion lines
32 D598,922 Filament spool container
33 D598,733 Filament spool
34 U.S. Pat. No. 7,555,357 Method for building three-dimensional objects with extrusion-based layered deposition systems
35 U.S. Pat. No. 7,534,386 Material and method for three-dimensional modeling
36 U.S. Pat. No. 7,502,023 High-resolution rapid manufacturing
37 U.S. Pat. No. 7,403,833 Method for optimizing spatial orientations of computer-aided design models
38 U.S. Pat. No. 7,384,255 Rapid prototyping system with controlled material feedstock
39 U.S. Pat. No. 7,374,712 Method for building three-dimensional models from thermoplastic modeling materials
40 U.S. Pat. No. 7,341,214 Cassette spool lock
41 U.S. Pat. No. 7,314,591 Method for three-dimensional modeling
42 U.S. Pat. No. 7,297,304 High-temperature modeling method
43 U.S. Pat. No. 7,255,821 Layered deposition bridge tooling
44 U.S. Pat. No. 7,236,166 High-resolution rapid manufacturing 45 U.S. Pat. No. 7,172,715 Filament spool auto-change in a modeling machine
46 U.S. Pat. No. 7,169,337 Method for loading filament in an extrusion apparatus
47 U.S. Pat. No. 7,127,309 Modeling apparatus with tray substrate
48 U.S. Pat. No. 7,125,512 Rapid prototype injection molding
49 U.S. Pat. No. 7,122,246 High-precision modeling filament
50 U.S. Pat. No. 7,063,285 Cassette device for reliable filament delivery
51 D514,913 Three-dimensional modeling substrate
52 U.S. Pat. No. 6,998,087 Extrusion method for three dimensional modeling
53 U.S. Pat. No. 6,923,634 Filament loading system in an extrusion apparatus
54 U.S. Pat. No. 6,869,559 Material and method for three-dimensional modeling
55 U.S. Pat. No. 6,866,807 High-precision modeling filament
56 U.S. Pat. No. 6,814,907 Liquefier pump control in an extrusion apparatus
57 U.S. Pat. No. 6,790,403 Soluble material and process for three-dimensional modeling
58 U.S. Pat. No. 6,776,602 Filament cassette and loading system
59 U.S. Pat. No. 6,749,414 Extrusion apparatus for three-dimensional modeling
60 U.S. Pat. No. 6,722,872 High temperature modeling apparatus
61 U.S. Pat. No. 6,685,866 Method and apparatus for three-dimensional modeling
62 U.S. Pat. No. 6,645,412 Process of making a three-dimensional object
63 U.S. Pat. No. 6,629,011 Autoinitialization in a three-dimensional modeling machine
64 U.S. Pat. No. 6,578,596 Apparatus and method for thermoplastic extrusion
65 U.S. Pat. No. 6,547,995 Melt flow compensation in an extrusion apparatus
66 U.S. Pat. No. 6,437,034 Water soluble rapid prototyping support and mold material
67 U.S. Pat. No. 6,367,791 Substrate mounting system for a three-dimensional modeling machine
68 U.S. Pat. No. 6,238,613 Apparatus and method for thermoplastic extrusion
69 U.S. Pat. No. 6,228,923 Water soluble rapid prototyping support and mold material
70 D436,111 Filament cartridge
71 U.S. Pat. No. 6,085,957 Volumetric feed control for flexible filament
72 U.S. Pat. No. 6,070,107 Water soluble rapid prototyping support and mold material
73 U.S. Pat. No. 6,067,480 Method and apparatus for in-situ formation of three-dimensional solid objects by extrusion of polymeric materials
74 U.S. Pat. No. 6,054,077 Velocity profiling in an extrusion apparatus
75 U.S. Pat. No. 6,028,410 Resonance detection and resolution
76 U.S. Pat. No. 6,022,207 Rapid prototyping system with filament supply spool monitoring
77 U.S. Pat. No. 6,004,124 Thin-wall tube liquefier
78 U.S. Pat. No. 5,968,561 High performance rapid prototyping system
79 U.S. Pat. No. 5,939,008 Rapid prototyping apparatus
80 U.S. Pat. No. 5,900,207 Solid freeform fabrication methods
81 U.S. Pat. No. 5,866,058 Method for rapid prototyping of solid models
82 U.S. Pat. No. 5,764,521 Method and apparatus for solid prototyping
83 U.S. Pat. No. 5,653,925 Method for controlled porosity three-dimensional modeling
84 U.S. Pat. No. 5,587,913 Method employing sequential two-dimensional geometry for producing shells for fabrication by a rapid prototyping system
85 U.S. Pat. No. 5,503,785 Process of support removal for fused deposition modeling
86 U.S. Pat. No. 5,491,643 Method for optimizing parameters characteristic of an object developed in a rapid prototyping system
87 U.S. Pat. No. 5,426,722 Method for optimizing the motion of a multi-axis robot
88 U.S. Pat. No. 5,340,433 Modeling apparatus for three-dimensional objects
89 U.S. Pat. No. 5,121,329 Apparatus and method for creating three-dimensional objects

What is claimed is:

1. A method of manufacturing a three-dimensional object comprising:
    sequentially depositing layers of a thermoplastic polymer composition mixture comprising a polymer phase and a particulate filler phase, said polymer phase comprising at least one thermoplastic polymer and said particulate filler phase being in sufficient quantity so as to render the three-dimensional object so formed to a specific gravity above 2.5;
    wherein said particulate filler phase comprises a material selected from the group consisting of tungsten, stainless steel alloys, copper, bismuth oxides, bismuth subcarbonates, bismuth oxychlorides, barium sulfates, barium titanates, and mixtures thereof;
    and wherein the method is a fused deposition modeling (FOM) additive process.

2. A method of manufacturing a three-dimensional object comprising:
    sequentially depositing layers of a thermoplastic polymer composition mixture comprising a polymer phase and a particulate filler phase, said polymer phase comprising at least one thermoplastic polymer and said particulate filler phase being in sufficient quantity so as to render the three-dimensional object so formed to a specific gravity above 2.5;
    wherein said particulate filler phase comprises a material selected from the group consisting of tungsten, stainless steel alloys, copper, bismuth oxides, bismuth subcarbonates, bismuth oxychlorides, barium sulfates, barium titanates, and mixtures thereof;
    and wherein the thermoplastic polymer composition mixture is polymeric filament sequentially deposited in layers.

3. The method according to claim 2, wherein the polymer filament is a tungsten and polycarbonate blend.

* * * * *